US012621748B2

(12) United States Patent
Mirza

(10) Patent No.: US 12,621,748 B2
(45) Date of Patent: May 5, 2026

(54) DYNAMIC REPORTING ADJUSTMENT FOR FIXED WIRELESS ACCESS

(71) Applicant: T-Mobile Innovations LLC, Overland Park, KS (US)

(72) Inventor: Mochamad Mirza, Bothell, WA (US)

(73) Assignee: T-Mobile Innovation LLC, Overland Park, KS (US)

( * ) Notice: Subject to any disclaimer, the term of this patent is extended or adjusted under 35 U.S.C. 154(b) by 832 days.

(21) Appl. No.: 17/947,541

(22) Filed: Sep. 19, 2022

(65) Prior Publication Data

US 2024/0107422 A1     Mar. 28, 2024

(51) Int. Cl.
*H04W 4/00*          (2018.01)
*H04L 5/00*          (2006.01)
*H04W 40/32*        (2009.01)
*H04W 48/18*        (2009.01)

(52) U.S. Cl.
CPC ........... *H04W 40/32* (2013.01); *H04L 5/0051* (2013.01); *H04W 48/18* (2013.01)

(58) Field of Classification Search
None
See application file for complete search history.

(56) References Cited

U.S. PATENT DOCUMENTS

| | | |
|---|---|---|
| 10,064,166 B1 | 8/2018 | Liu et al. |
| 10,321,334 B1 | 6/2019 | Marupaduga et al. |
| 2013/0195070 A1* | 8/2013 | Bashar ................... H04W 72/53 |
| | | 370/330 |
| 2017/0331645 A1 | 11/2017 | Baligh et al. |
| 2018/0183556 A1 | 6/2018 | Shin et al. |
| 2018/0234136 A1 | 8/2018 | Marinier et al. |
| 2019/0364546 A1 | 11/2019 | Kwak et al. |
| 2020/0245166 A1 | 7/2020 | Kwak et al. |
| 2020/0351984 A1* | 11/2020 | Talebi Fard ............ H04W 4/08 |
| 2021/0092625 A1 | 3/2021 | Wang et al. |
| 2021/0126753 A1 | 4/2021 | Mochizuki et al. |
| 2022/0369226 A1* | 11/2022 | Soman .............. H04W 52/0254 |

* cited by examiner

*Primary Examiner* — Zewdu A Beyen
(74) *Attorney, Agent, or Firm* — Jones Burke, PLLC

(57) ABSTRACT

Systems and methods are provided for making dynamic reporting adjustments for fixed wireless access (FWA) devices. Methods include grouping wireless devices connected to an access node in a network into one of a mobile group and a fixed wireless access (FWA) group. The method additionally includes adjusting a periodicity for sending a channel state information (CSI)-reference signal (RS) from the access node to the wireless devices in the FWA group and adjusting a periodicity for receiving a sounding reference signal (SRS) for the FWA group.

20 Claims, 6 Drawing Sheets

500

OBTAIN NETWORK SLICE
INFORMATION FOR WIRELESS
DEVICES
510

IDENTIFY DEVICES WITH A FIRST
SLICE DIFFERENTIATOR AND A
SECOND SLICE DIFFERENTIATOR
520

GROUP WIRLESS DEVICES WITH
FIRST SLICE DIFFERENTATOR IN
FWA GROUP AND SECOND SLICE
DIFFERENTIATOR IN MOBILE
GROUP
530

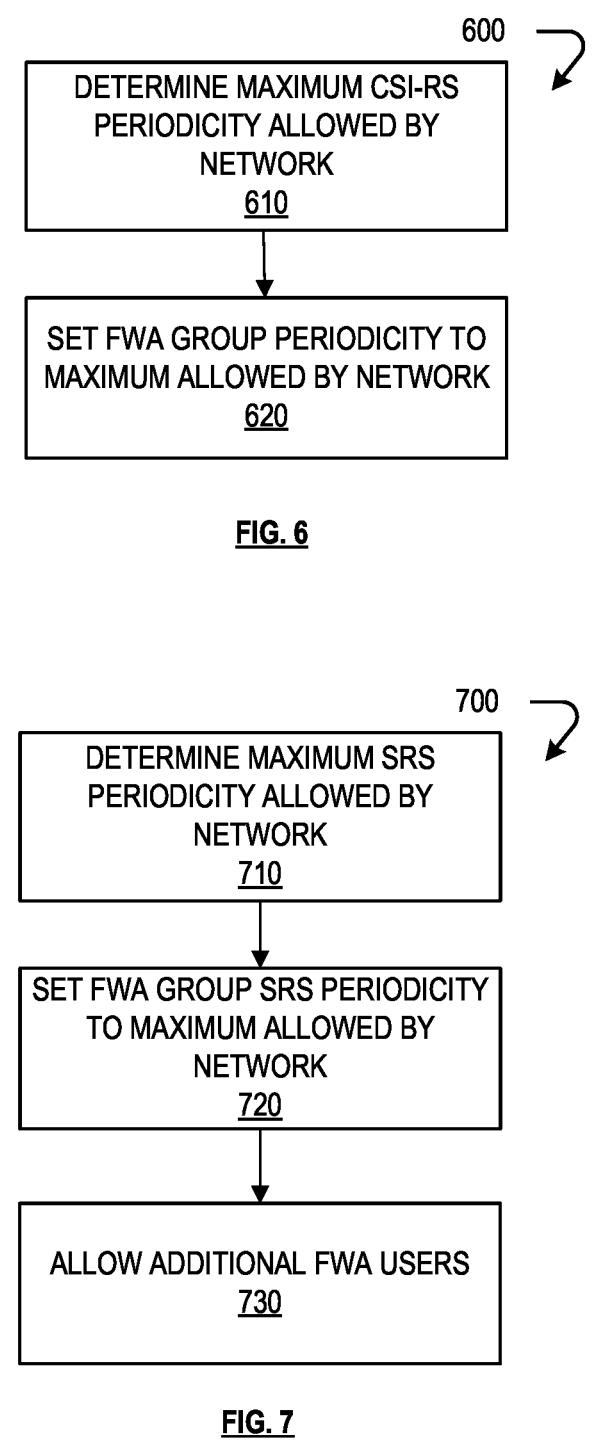

600

```
┌──────────────────────────────┐
│  DETERMINE MAXIMUM CSI-RS     │
│  PERIODICITY ALLOWED BY       │
│  NETWORK                      │
│  610                          │
└──────────────────────────────┘
              │
              ▼
┌──────────────────────────────┐
│  SET FWA GROUP PERIODICITY TO │
│  MAXIMUM ALLOWED BY NETWORK   │
│  620                          │
└──────────────────────────────┘
```

```
┌──────────────────────────────┐
│  DETERMINE MAXIMUM SRS        │
│  PERIODICITY ALLOWED BY       │
│  NETWORK                      │
│  710                          │
└──────────────────────────────┘
              │
              ▼
┌──────────────────────────────┐
│  SET FWA GROUP SRS PERIODICITY│
│  TO MAXIMUM ALLOWED BY        │
│  NETWORK                      │
│  720                          │
└──────────────────────────────┘
              │
              ▼
┌──────────────────────────────┐
│  ALLOW ADDITIONAL FWA USERS   │
│  730                          │
└──────────────────────────────┘
```

FIG. 7

DYNAMIC REPORTING ADJUSTMENT FOR FIXED WIRELESS ACCESS

TECHNICAL BACKGROUND

A wireless network, such as a cellular network, can include an access node (e.g., base station) serving multiple wireless devices or user equipment (UE) in a geographical area covered by a radio frequency transmission provided by the access node. As technology has evolved, different carriers within the cellular network may utilize different types of radio access technologies (RATs). RATs can include, for example, 3G RATs (e.g., GSM, CDMA etc.), 4G RATs (e.g., WiMax, LTE, etc.), and 5G RATs (new radio (NR)). Further, different types of access nodes may be implemented for deployment for the various RATs. For example, an eNodeB may be utilized for 4G RATs and a gNodeB may be utilized for 5G RATs. Deployment of the evolving RATs in a network provides numerous benefits. For example, newer RATs may provide additional resources to subscribers, faster communications speeds, and other advantages. To ensure consistent coverage through a wide geographic range, existing technologies such as 4G can be used in combination with newer technologies such as 5GNR. For example, in an E-UTRAN New Radio Dual Connectivity (EN-DC) configuration, wireless devices connect to an LTE eNodeB and 5G gNodeB.

Further, in order to bring network access to remote areas, network operators employing 5G have begun to utilize fixed wireless access (FWA). FWA enables network operators to deliver broadband services to suburban and rural areas, supporting home and business applications where fiber is prohibitively expensive FWA employs standardized 3GPP architectures and common mobile components to deliver ultra-high-speed broadband services to stationary or fixed devices of residential subscribers and enterprise customers. Thus, FWA can provide suburban and rural consumers with the bandwidth required to support high definition streaming services and high speed Internet access.

In order to avoid prolonged decreases in quality of service (QoS) or other performance parameters, the base station sends both fixed and mobile wireless devices a channel state information reference signal (CSI-RS) in the downlink direction. CSI-RS are used for beamforming support and play an important role in performing tasks such as beam acquisition and evaluation, adaptation of the beam, decision making for beam switching, and UE tracking with steerable beams.

In response to the CSI-RS, wireless devices measure the quality of the down link channel and report this in the uplink, for example, through CSI or quality channel indicator (QCI) reports. UEs will use these reference signals to report channel status information such as CSI-reference signal received power (RSRP), CSI-reference signal received quality (RSRQ) and CSI-signal to noise and interference ratio (SINR) for mobility procedures. CSI reports tell the access node how good or bad a channel is at a specific time.

In response to CSI reports, a network entity can attempt to properly perform modulation coding scheme (MCS) assignment and allocate and schedule resources for each of the wireless devices to positively impact performance. The network entity considers the number of number of resource blocks and MCS for each CQI value to properly allocate the resources for each of the wireless devices.

Further, both fixed and mobile wireless devices transmit a sounding reference signal (SRS) to the base station in the uplink direction. The SRS is transmitted for uplink channel sounding, including channel quality estimation and synchronization. The transmission of the SRS can serve to be a contributing factor limiting the number of FWA wireless devices that can be served by a base station.

Under certain undesirable conditions, the wireless devices may have a need for increased frequency of reporting to the network entity in order to benefit from resource reallocation. However, under conditions that are predictable and stable, such as for fixed wireless devices experiencing little channel condition variation, repeated re-evaluation is unnecessary and increases overhead. Accordingly, a system is needed that will dynamically alter the stored CSI-RS periodicity and SRS periodicity for transmissions between base stations and selected connected wireless devices. Further, there is a need for systems and methods that can improve overall resource utilization and improve performance within a wireless network.

OVERVIEW

Exemplary embodiments described herein include systems, methods, and processing nodes for dynamically adjusting periodicity for channel state information-reference signal (CSI-RS) and sounding reference signal (SRS) for fixed wireless access (FWA) devices. Embodiments of the method include grouping wireless devices connected to an access node in a network into one of a mobile group and a FWA group. The method further includes adjusting a periodicity for sending a CSI-RS from the access node to the wireless devices in the FWA group and adjusting a periodicity for receiving a SRS for the FWA group. In embodiments set forth herein, the changes to the CSI-RS periodicity cause the wireless devices in the FWA group to receive the CSI-RS from the access node less frequently than the wireless devices in the mobile group. Further, the adjustment to SRS periodicity causes the wireless devices in the FWA group to send the SRS to the access node less frequently than the wireless devices in the mobile group.

Embodiments disclosed herein further include a system having a processing node programmed to perform multiple operations. The multiple operations include grouping wireless devices connected to an access node in a network into one of a mobile group and an FWA group. The operations further include adjusting a periodicity of a CSI-RS sent from the access node to the wireless devices in the FWA group, causing the wireless devices in the FWA group to receive the CSI-RS from the access node less frequently than the wireless devices in the mobile group. The operations additionally include adjusting a periodicity of a SRS for the FWA group, causing the wireless devices in the FWA group to send the SRS to the access node less frequently than the wireless devices in the mobile group.

Further embodiments include an access node having a processor performing multiple operations. The operations include grouping wireless devices connected to the access node in a network into at least two groups including a FWA group. The operations further include adjusting a periodicity for the CSI-RS sent from the access node to the wireless devices in the FWA group, causing the wireless devices in the FWA group to receive the CSI-RS from the access node less frequently than prior to the adjustment. The operations further include adjusting a periodicity for a SRS for the FWA group, thereby causing the wireless devices in the FWA group to send the SRS to the access node less frequently than prior to the adjustment.

3

Figure 2:
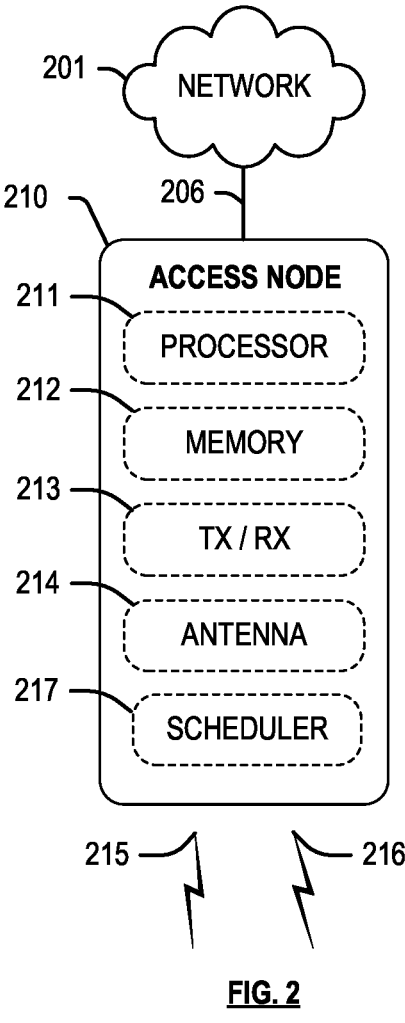

FIG. 2 illustrates an exemplary configuration of an access node in accordance with disclosed embodiments.

Figure 3:
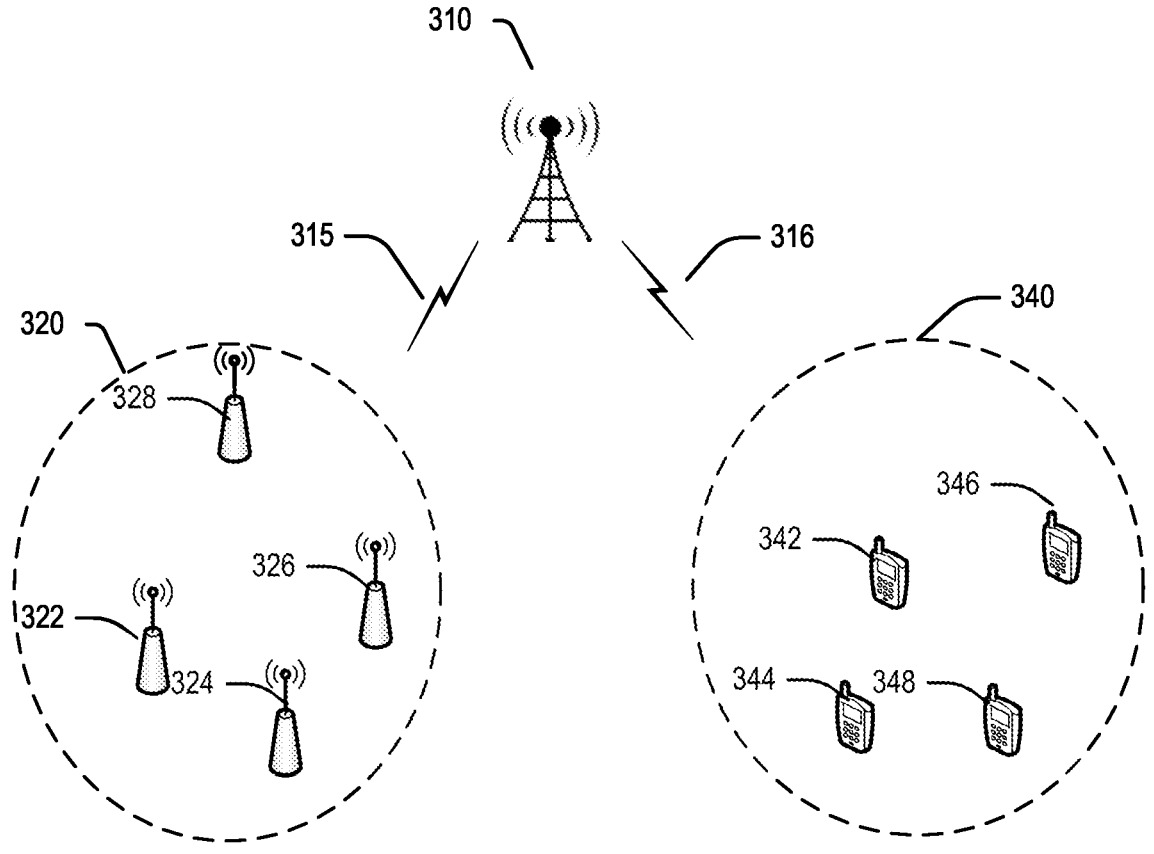

FIG. 3 depicts an access node communicating with wireless devices in accordance with disclosed embodiments.

Figure 4:
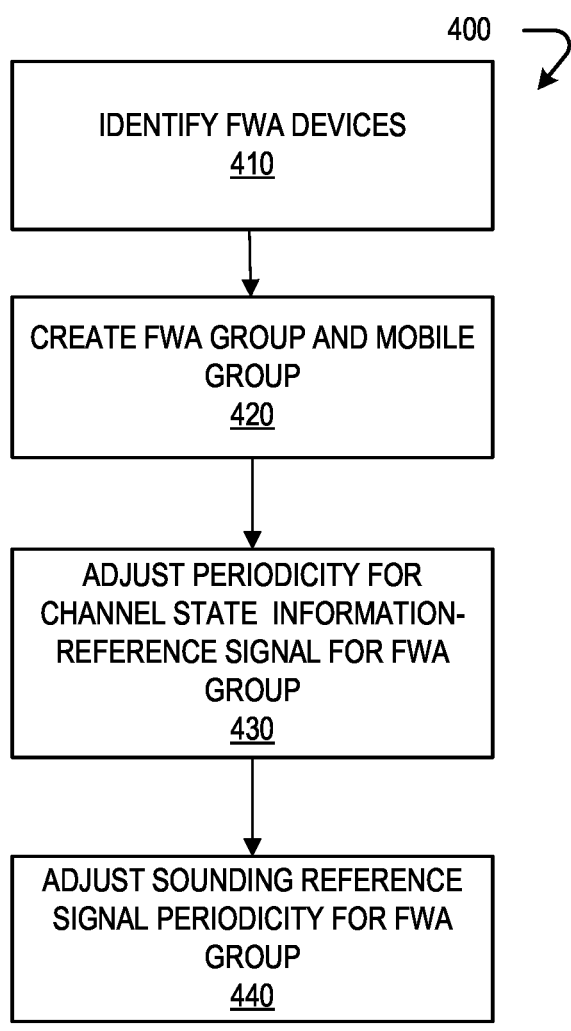

FIG. 4 depicts a method for dynamically adjusting reporting protocols in accordance with the disclosed embodiments.

Figure 5:
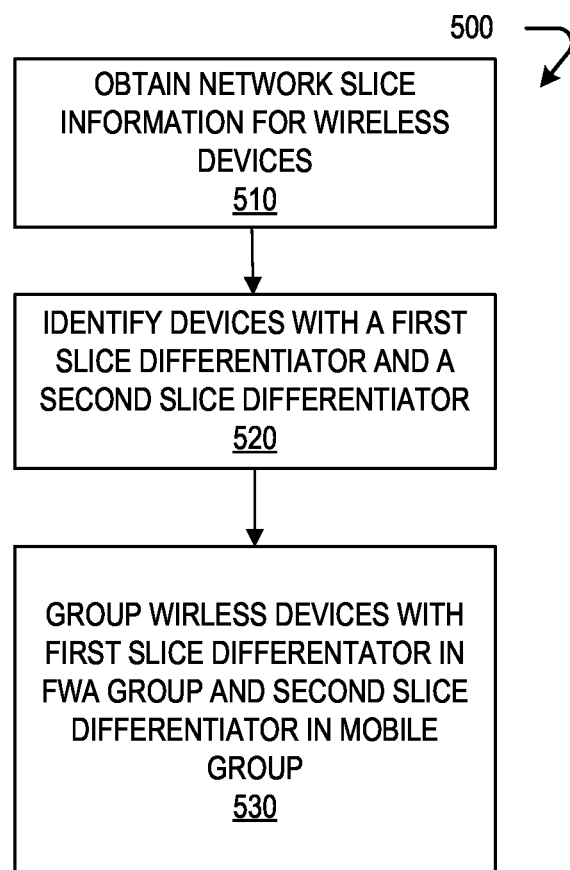

FIG. 5 depicts further details of a method for adjusting reporting protocols in accordance with disclosed embodiments.

FIG. 6 depicts further details of a method for adjusting reporting protocols in accordance with disclosed embodiments.

FIG. 7 depicts further details of a method for adjusting reporting protocols in accordance with disclosed embodiments.

DETAILED DESCRIPTION

Exemplary embodiments described herein include systems, methods, and processing nodes for dynamically adjusting a reporting protocols for wireless device. More particularly, embodiments disclosed herein adjust reporting protocols for fixed wireless access (FWA) devices. Some embodiments operate in networks utilizing a 5G NR technology. Embodiments further encompass networks utilizing an EN-DC architecture, which allows devices to access both LTE and 5G simultaneously. Other network configurations are within scope of the disclosure.

In embodiments disclosed herein, a cell or wireless network may be provided by an access node. The access node may utilize one or more antennas to communicate with wireless devices or UEs. Performance at a particular wireless device may be dependent on a number of factors including, for example, channel quality as indicated by radio frequency (RF) parameters. Thus, performance may also be dependent upon device location. While some types of wireless devices are mobile, other types of wireless devices may be fixed, and thus may experience fewer channel quality changes.

These devices having fixed wireless access (FWA) may include, for example, customer premises equipment (CPE). FWA devices including CPE may be stationary and thus experience few channel quality changes. Accordingly, embodiments disclosed herein reduce overhead by increasing the periodicity of the channel state information reference signal (CSI-RS) sent from the access node. The CSI-RS is a reference signal that is used in the downlink direction in 5G NR for the purpose of channel sounding and used to measure the characteristics of a radio channel so that it can use correct modulation, code rate, beam forming etc. The CSI-RS is used by the UE to measure the quality of the DL channel and report this in the uplink through the CQI reports. However, the CSI-RS consumes a large amount of overhead. The increase in periodicity results in the CSI-RS being sent less often, thus reducing overhead.

Further, in embodiments set forth herein, the periodicity of the SRS for FWA wireless devices can also be increased. The SRS is transmitted by the UE on the uplink for uplink channel sounding and allows the network to estimate the quality of the channel at different frequencies. The number of UEs accommodated by the SRS is limited by both antenna switching type and SRS periodicity.

Embodiments set forth herein make the aforementioned periodicity alterations only for FWA devices. Accordingly, the periodicity for CSI-RS and SRS for mobile devices may remain unchanged. Therefore, embodiments set forth herein employ the preliminary step of identifying FWA devices. In embodiments set forth herein, two groups are created, with one group including FWA devices in the network and another group including mobile devices in the network. In embodiments set forth herein, the grouping is based on network slice information. However, other methods of grouping the wireless devices are within scope of the disclosure. After grouping the wireless devices, embodiments set forth herein may set CSI-RS and SRS periodicity for the FWA group to a maximum allowed in the network.

The aforementioned periodicity adjustments will positively impact performance for the FWA group by reducing overhead and allowing the number of users to increase. The adjustment to periodicity for the FWA group is configured to improve overall network performance. Thus, in this disclosure, optimization of CSI-RS and SRS periodicity for FWA is described and improves downlink throughput and increases the number of SRS users that can be accommodated.

The term "wireless device" refers to any wireless device included in a wireless network. As set forth above, wireless devices may be fixed or mobile. Further, the term "wireless device" may include a relay node, which may communicate with an access node. The term "wireless device" may also include an end-user wireless device, which may communicate with the access node through the relay node. The term "wireless device" may further include an end-user wireless device that communicates with the access node directly without being relayed by a relay node.

The terms "transmit" and "transmission" in data communication may also encompass receive and receiving data. For example, "data transmission rate" may refer to a rate at which the data is transmitted by a wireless device and/or a rate at which the data is received by the wireless device.

An exemplary system described herein includes at least an access node (or base station), such as an eNodeB, a next generation NodeB (gNodeB), and a plurality of end-user wireless devices. For illustrative purposes and simplicity, the disclosed technology will be illustrated and discussed as being implemented in the communications between an access node (e.g., a base station) and a wireless device (e.g., an end-user wireless device). It is understood that the disclosed technology for may also be applied to communication between an end-user wireless device and other network resources, such as relay nodes, controller nodes, antennas, etc. Further, multiple access nodes may be utilized. For example, some wireless devices may communicate with an LTE eNodeB and others may communicate with an NR gNodeB.

In addition to the systems and methods described herein, the operations for dynamically adjusting reporting periodicity may be implemented as computer-readable instructions or methods, and processing nodes on the network for executing the instructions or methods. The processing node may include a processor included in the access node or a processor included in any controller node in the wireless network that is coupled to the access node.

Figure 1:
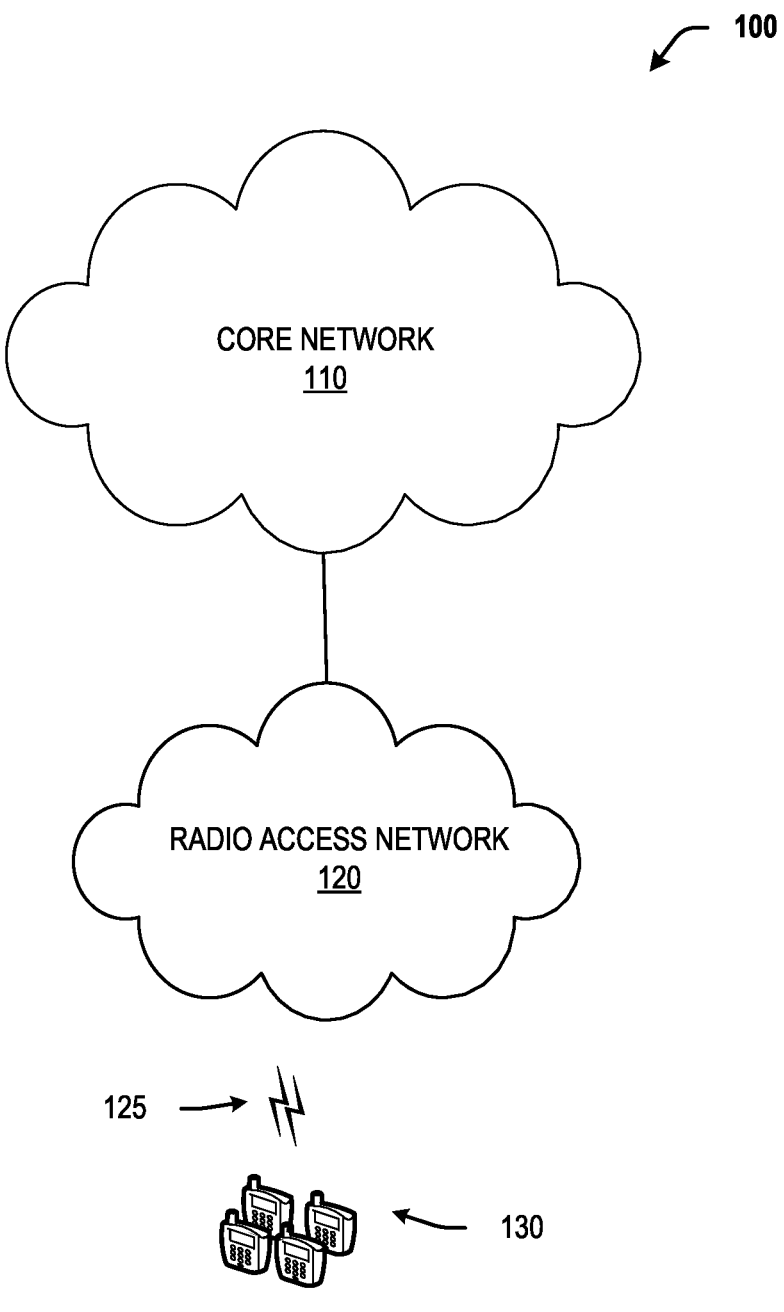
FIG. 1 depicts an exemplary system for wireless communication, in accordance with the disclosed embodiments.

FIG. 1 depicts an exemplary communication network 100. A core network 110 is coupled to a radio access network (RAN) 120 that serves wireless devices 130 over communication links 125. For example, the wireless devices 130 can be end-user wireless devices (e.g., UEs). Communication links 125 use 5G NR, 4G LTE, or any other suitable type of radio access technology (RAT), and core network 110 can be structured using a service-based architecture (SBA) utilizing core network functions and elements, including, for example, user plane functions (UPF) control plane functions (CPF).

The RAN 120 can include various access network functions and devices disposed between the core network 110 and the end-user wireless devices 130. For example, the RAN 120 includes at least an access node (or base station), such as an eNodeB and/or gNodeB communicating with the plurality of end-user wireless devices 130. It is understood that the disclosed technology may also be applied to communication between an end-user wireless device and other network resources, depending on the RAT and network technology being implemented. Further, either of core network 110 and radio access network 120 can include one or more of a local area network, a wide area network, and an internetwork (including the Internet) and capable of communicating signals and carrying data, for example, to support voice, push-to-talk, broadcast video, and data communications by end-user wireless devices 130. The core network 110 may include a user plane function (UPF) and control plane function (CPF) but may alternatively or additionally include packet gateways, such as a CUPS based user plane S-GW, P-GW, or SAE-GW.

The core network 110 may incorporate many functions not shown in FIG. 1. For example, the CPF may include but are not limited to a Network Slice Selection Function (NSSF), a Network Exposure Function (NEF), a NF Repository Function (NRF), a Policy Control Function (PCF), a Unified Data Management (UDM), an Application Function (AF), a Short Message Service Function (SMSF), a Core Access and Mobility management Function (AMF), a Session Management Function (SMF), and an Authentication Server Function (AUSF). The UPF may also include, for example, a Unified Data Repository (UDR). The CPF can provide one or more network functions based on a request-response or subscribe-notify model. The network functions may form a micro services-based architecture, which may include network functions distributed over different cloud infrastructures. Additionally, many services may span different network functions and domains that work in unison.

The NRF maintains the list of available network functions and their profiles. The NRF maintains an updated repository of the network components along with services provided by each of the elements in the core network. The NRF additionally provides a discovery mechanism that allows the elements to discover each other. The NRF provides a registration function that allows each network function to register a profile and a list of services with the NRF. It also performs services registration and discovery so that different network functions can find each other. As one example, the SMF, which is registered to NRF, becomes discoverable by the AMF when a UE or other device tries to access a service type served by the SMF. The NRF broadcasts available services once they are registered in the 5G core 110. To use other network functions, registered functions can send service requests to the NRF.

The UDM interfaces with network functions such as AMF and SMF so that relevant data becomes available to AMF and SMF. The UDM generates authentication vectors when requested by the AUSF, which acts as an authentication server. The AMF performs the role of access point to the 5G core, thereby terminating RAN control plane and UE traffic originating on either the N1 or N2 reference interface. In the 5G core, the functionality of the 4G Mobility Management Entity (MME) is decomposed into the AMF and the SMF. The AMF receives connection and session related information from the UE using N1 and N2 interfaces and is responsible for handling connection and mobility management tasks.

The UDR may provide unified data storage accessible to both control plane NFs and user plane NFs. Thus, the UDR may be a repository shared between control plane NFs and the UPF. The UDR may include information about subscribers, application-specific data, and policy data. The UDR can store structured data that can be exposed to an NF. The UPF may perform operations including, but not limited to, packet routing and forwarding, packet inspection, policy enforcement for the user plane, Quality-of-Service (QoS) handling, etc. When compared with 4G EPC, the functions of the UPF may resemble those of the SGW-U (Serving Gateway User Plane function) and PGW-U (PDN Gateway User Plane function).

Wireless devices 130 may be any device, system, combination of devices, or other such communication platform capable of communicating wirelessly with RAN 120 using one or more frequency bands deployed therefrom. Each of wireless devices 130 may be, for example, a mobile phone, a wireless phone, a wireless modem, a customer premises equipment (CPE), a personal digital assistant (PDA), a voice over internet protocol (VoIP) phone, a voice over packet (VOP) phone, or a soft phone, as well as other types of devices or systems that can exchange audio or data via RAN 120.

Additionally, in recent years, networks have evolved to connect with the Internet of things (IoT), which describes the network of physical objects or things that are embedded with sensors, software, and other technologies for the purpose of connecting and exchanging data with other devices and systems over the Internet. Cellular IoT is a way of connecting physical things, such as sensors to the internet by having them utilize the same mobile networks as wireless devices. In the consumer market, IoT technology is frequently utilized to equip the "smart home", including devices and appliances such as lighting fixtures, thermostats, home security systems and cameras, and other appliances that support one or more common ecosystems, and can be controlled via devices associated with that ecosystem, such as smartphones and smart speakers.

As set forth above, some wireless devices may be mobile and others may be fixed wireless devices utilizing FWA. In embodiments set forth herein, access nodes, processing nodes, gateway nodes, or other nodes in the RAN 120 may employ methods disclosed to identify FWA devices and form an FWA group and a mobile group. The node may then adjust the reporting periodicity for the FWA devices as further described herein. Additionally, the node may adjust the reporting periodicity for devices in the mobile group on an individual basis based on RF conditions.

Other network elements may be present to facilitate communication but are omitted for clarity, such as base stations, base station controllers, mobile switching centers, dispatch application processors, and location registers such as a home location register or visitor location register. Components not specifically shown in FIG. 1 can further include processing nodes, controller nodes, routers, gateways, and physical and/or wireless data links for communicating signals among various network elements, additional base stations, controller nodes, telephony switches, internet routers, network gateways, computer systems, communication links, or other type of communication equipment, and combinations thereof.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

FIG. 2 depicts an exemplary access node 210. Access node 210 may comprise, for example, a macro-cell access node, or any access node described with reference to FIG. 1. Access node 210 is illustrated as comprising a processor 211, memory 212, transceiver(s) 213, antenna(s) 214, and scheduler 217. Processor 211 executes instructions stored on memory 212, while transceiver(s) 213 and antenna(s) 214 enable wireless communication with other network nodes, such as wireless devices and other nodes. For example, access node 210 may be configured to group connected wireless devices into FWA groups and mobile groups. The access node 210 may be further configured to adjust reporting periodicity for the wireless devices based on group membership. Scheduler 217 may be provided for scheduling resources based on the CSI reports. These features may be enabled by access node 210 comprising two co-located cells, or antenna/transceiver combinations that are mounted on the same structure. Network 201 may be similar to network 101 discussed above. In some embodiments, the wireless devices may operate in carrier aggregation mode, during which a wireless device utilizes more than one carrier, enabling the wireless devices to communicate with access node 210 using a combination of resources from multiple carriers. Thus, the access node 210 may communicate with wireless devices using communication links 215 and 216, which may utilize the same or different RATs. Further, instructions stored on memory 212 can include instructions for dynamically adjusting reporting periodicity based on group, which will be further explained below with reference to FIGS. 3-7.

FIG. 3 depicts an access node 310 communicating with wireless devices over communication links 315 and 316 in accordance with disclosed embodiments. The wireless devices may be placed in wireless device groups 320 and 340. The group 320 may include wireless devices 322, 324, 326, 328, which may be FWA devices. The group 340 may include wireless devices 342, 344, 346, and 348. Thus, the group 340 may be a mobile group and the group 320 may be a stationary FWA group. Thus, in order to differentiate the UEs, the access node 310 groups the UEs into the FWA group 320 and the mobile group 340.

The access node 310 may accomplish the grouping using a variety of techniques. For example, the access node 310 may group the wireless devices based on respective single-network slice selection assistance information (S-NSSAI). S-NSSAI is an identifier for a network slice across the 5G core, 5G-RAN and the UE. The S-NSSAI may include a slice service type (SST) and a slice differentiator (SD). SST refers to the expected network slice behavior in terms of features and services. SD complements the SST to differentiate amongst multiple network slices of the same SST.

The access node 310 may, for example, group the wireless devices having a first SD value in the FWA group and group wireless devices with a second SD value in the mobile group. For example, the SST for both groups may be equal to one. However, the SD for the mobile group may be equal to zero and the SD for the FWA group may be equal to one.

In further embodiments, the access node 310 may group the wireless devices based on a public land mobile network identifier (PLMN-ID). Alternatively, the access node 310 may group the wireless devices based on a quality of service (QoS) class identifier (QCI). As a further alternative, the access node 310 may group the wireless devices based on a, 5G QoS identifier (5QI). Yet a further alternative includes grouping the wireless devices based on a service profile identifier/RAT frequency selection priority index (SPID/RFSP). Additional alternatives include grouping the wireless devices based on international mobile equipment identity-type allocation code (IMEI-TAC), international mobile station equipment identity software (IMWEI-SV) and/or international mobile station equipment identity software version (IMEISV). Various combinations of the aforementioned indicators may be utilized by the access node 310 to group the wireless devices.

In embodiments set forth herein, the access node 310 may adjust the CSI-RS periodicity for wireless devices 322, 324, 326, and 328 in the FWA group 320 to a maximum allowed by the network. While accurate CSI is important for mobile users as channel conditions can change rapidly due to high mobility, the situation is completely different for the FWA wireless devices 322, 324, 326, and 328. Because these wireless devices are stationary, their channel conditions are relatively stable. Periodic CSI-RS transmission can vary within a network. For example, the illustrated network may allow CSI-RS transmission every 4 ms to every 640 ms. Thus, in embodiments set forth herein, the access node 310 adjusts the CSI-RS periodicity for the wireless devices 322, 324, 326, and 328 in the FWA group 320 from 40 ms to 640 ms. In this example, 640 ms may be the maximum periodicity allowed by the network. In embodiments set forth herein, this adjustment reduces overhead by $\frac{1}{16}^{th}$ and leads to downlink throughput improvement of about 5%. This embodiment is merely exemplary and other adjustments to CSI-RS are within scope of the disclosure.

In contrast, the access node 310 may not adjust the CSI-RS periodicity for the wireless devices 342, 344, 346, and 348 in the mobile group 340. For example, the wireless devices in the mobile group 340 may continue to receive CSI-RS from the access node 310 every 40 ms. In further embodiments, the access node 310 may adjust CSI-RS periodicity for selected devices within the mobile group 340 when their channel conditions change. However, this adjustment would apply to individual mobile devices based on channel conditions rather than the group as a whole.

The access node 310 may further adjust the SRS periodicity for the wireless devices 322, 324, 326, and 328 in the FWA group 320 to a maximum allowed by the network. A high frequency of SRS transmissions is not necessary because channel conditions for the FWA group 320 are generally stable. In some embodiments, the maximum SRS periodicity allowed by the network may, for example, be 80 ms. The access node 310 may alternatively increase the SRS periodicity for the wireless devices 322, 324, 326, and 328 to another value which is greater than the initial default value, but less than the maximum allowed by the network.

In embodiments set forth herein, the access node 310 is further able to increase a number of connected wireless devices in the FWA group 320 based on the adjusted SRS periodicity. Because the allowed number of SRS users depends on both antenna switching type (xTyR) and SRS periodicity, adjusting either one of these quantities can lead to an increase in the allowed number of SRS users. For example, in a network utilizing a 2T4R antenna switching, increasing SRS periodicity from 40 ms to 80 ms doubles the number of allowed SRS users for multi-user MIMO. Further, while the access node 310 changes the SRS periodicity for the FWA group 320, the access node 310 leaves the SRS periodicity for the mobile group 340 unchanged as the channel conditions for the mobile group 340 may be much less stable than for the FWA group 320. The disclosed methods for dynamically adjusting reporting protocols are discussed further below.

FIG. 4 illustrates an exemplary method 400 for dynamically adjusting reporting protocols for wireless devices in a network. Method 400 may be performed by any suitable processor discussed herein, for example, a processor included in access node 210 or 310, or a processor included in a processing node or controller node. For discussion purposes, as an example, method 400 is described as being performed by a processor included in access node 310.

Method 400 starts in step 410, in which the access node 310 may identify FWA devices. In embodiments described herein, the access node 310 uses network slice information as described above to identify the FWA devices. However, other methods of identifying FWA devices are within scope of the disclosure.

In step 420, the access node 310 creates two groups of wireless devices, including an FWA group and a mobile group and puts the connected wireless devices in one of the two groups. The FWA group will have relatively stable channel conditions as the devices in the FWA group remain stationary. The mobile group may experience varying channel conditions as the wireless devices within the mobile group move between different locations with different signal conditions.

In step 430, the access node 310 adjusts the periodicity for CSI-RS for the FWA group. For example, the access node 310 may adjust the periodicity for CSI-RS to be the maximum established by the network. The established maximum value may be predetermined and may be stored, for example, in a network database or a memory of the access node 310. As the CSI-RS is transmitted in the downlink by the access node 310, the access node 310 adjusts its own protocol for sending the CSI-RS.

In step 440, the access node 310 adjusts the SRS periodicity for the FWA group. In some embodiments, the access node 310 may increase the SRS periodicity to a maximum established by network operators. The established maximum value may be predetermined and may be stored, for example, in a network database or a memory of the access node 310. Because the SRS is transmitted in the uplink by the wireless device to the access node 310, the access node 310 may instruct the wireless device to decrease its SRS frequency (i.e., increase the SRS periodicity) through an RRC reconfiguration message or other message directed specifically to the wireless device.

The increase in periodicity or decrease in frequency of signal transmission leads to less frequent reallocation of resources where channel conditions are stable, thereby reducing overhead. In further embodiments, the access node 310 may transform a periodic reporting scheme to an aperiodic reporting scheme or vice versa as long as the CSI-RS to the FWA wireless devices and the SRS from the FWA wireless devices are transmitted less frequently than the stored protocol.

FIG. 5 depicts an exemplary method 500 for grouping wireless devices in according with embodiments described herein. Method 500 may be performed by any suitable processor discussed herein, for example, a processor included in access node 210 or 310, or a processor included in s processing node or controller node. For discussion purposes, as an example, method 500 is described as being performed by a processor included in access node 310.

In step 510, the access node 310 obtains network slice information for the connected wireless devices. Each wireless device may access multiple slices over the same access node. S-NSSAI is an identifier for a network slice. S-NSSAI may include a slice service type (SST) and slice differentiator (SD).

In step 520, the access node 310 identifies devices with a first SD and a second SD. The SD differentiates between multiple network slices with the same SST. The access node 310 may, for example, identify first and second SDs for the connected wireless devices.

In step 530, the access node 310 may group the wireless devices having a first SD value in the FWA group and group wireless devices with a second SD value in the mobile group. For example, the SST for both groups may be equal to one. However, the SD for the mobile group may be equal to zero and the SD for the FWA group may be equal to one.

FIG. 6 illustrates a method 600 for dynamically adjusting the CSI-RS periodicity for wireless devices in a network. Method 600 may be performed by any suitable processor discussed herein, for example, a processor included in access node 210 or 310 or a processor in a processing node or controller node. For discussion purposes, as an example, method 600 is described as being performed by a processor included in access node 310.

In step 610, the access node 310 determines a maximum CSI-RS periodicity allowed by the network. The maximum CSI-RS periodicity allowed by the network may be stored, for example, in a network database or in a memory of the access node 310. In some embodiments, the maximum may be, for example, 640 ms. In other embodiments, reporting may not be required and can be eliminated for stationary devices.

In step 620, the access node 310 sets FWA group periodicity to the maximum periodicity identified by the access node in step 610. As set forth above, the reduction in reporting frequency reduces overhead for the FWA group. Because the FWA group devices are stationary, they typically do not experience changes in channel conditions that require reallocation of resources.

FIG. 7 depicts an exemplary method 700 for adjusting SRS periodicity in accordance with disclosed embodiments. Method 700 may be performed by any suitable processor discussed herein, for example, a processor included in access node 210 or 310, or a processor included in a processing node or controller node. For discussion purposes, as an example, method 700 is described as being performed by a processor included in access node 310.

In step 710, the access node 310 determines a maximum SRS periodicity allowed by the network. The maximum SRS periodicity allowed by the network may be stored, for example, in a network database, or in a memory of the access node 310. In one embodiment, the maximum periodicity may be 80 ms. However, in another embodiment, FWA devices may be able to eliminate reporting entirely.

In step 720, the access node 310 sets the FWA group SRS periodicity to a maximum periodicity identified in step 710. As set forth above, the reduction in reporting frequency reduces overhead for the FWA group. Because the FWA group devices are stationary, they typically do not experience changes in channel conditions that require reallocation of resources. The access node 310 may send a message to the wireless devices in the FWA group directing them to report less frequently. For example, FWA devices reporting every 40 ms may be directed to report every 80 ms.

In step 730, the access node 310 may allow additional FWA devices to connect. As set forth above, the increase in the reporting periodicity may permit twice as many devices to connect. Thus, if eight devices are connected prior to the change in SRS periodicity, sixteen devices may be connected once the change in periodicity occurs.

Accordingly, as set forth above, embodiments provided herein increase reporting periodicity, thus decreasing reporting frequency. Because CSI-RS and SRS reporting consume resources, it is desirable to reduce reporting for stationary devices unlikely to experience drastic changes in channel conditions.

In some embodiments, methods 400, 500, 600, and 700 may include additional steps or operations. Furthermore, the methods may include steps shown in each of the other methods. Additionally, the order of steps shown is merely exemplary and the steps may be re-ordered as appropriate. As one of ordinary skill in the art would understand, the methods 400, 500, 600, and 700 may be integrated in any useful manner.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:

grouping wireless devices connected to an access node in a network into one of a mobile group and a fixed wireless access (FWA) group;

adjusting a periodicity for sending a channel state information (CSI)-reference signal (RS) from the access node to the wireless devices in the FWA group, wherein adjusting includes increasing the periodicity, causing the wireless devices in the FWA group to receive the CSI-RS from the access node less frequently than the wireless devices in the mobile group; and adjusting a periodicity for receiving a sounding reference signal (SRS) from the FWA group, causing the wireless devices in the FWA group to send the SRS to the access node less frequently than the wireless devices in the mobile group.

2. The method of claim 1, further comprising grouping the wireless devices into the mobile group and the FWA group based on respective single-network slice selection assistance information (S-NSSAI).

3. The method of claim 2, wherein the S-NSSAI includes a slice service type (SST) and a slice differentiator (SD) and grouping the wireless devices includes grouping wireless devices having a first SD value in the FWA group.

4. The method of claim 3, further comprising grouping wireless devices with a second SD value in the mobile group.

5. The method of claim 1, further comprising grouping the wireless devices based on at least one of a public land mobile network identifier (PLMN-ID), quality of service (QoS) class identifier (QCI), 5G QoS identifier (5QI), service profile identifier/RAT frequency selection priority index (SPID/RFSP), international mobile equipment identity-type allocation code (IMEI-TAC), international mobile station equipment identity software (IMEI-SV) and international mobile station equipment identity software version (IMEISV).

6. The method of claim 1, further comprising adjusting the CSI-RS periodicity for the FWA group to a maximum allowed by the network.

7. The method of claim 6, wherein the maximum allowed by the network is 640 ms.

8. The method of claim 1, further comprising adjusting the SRS periodicity for the wireless devices in the FWA group to a maximum allowed by the network.

9. The method of claim 8, wherein the maximum allowed by the network is 80 ms.

10. The method of claim 1, further comprising increasing a number of connected wireless devices in the FWA group based on the adjusted SRS periodicity.

11. A system comprising a processing node; and a processor coupled to the processing node programmed to perform operations comprising:

grouping wireless devices connected to an access node in a network into one of a mobile group and a fixed wireless access (FWA) group;

adjusting a periodicity of a channel state information (CSI)-reference signal (RS) sent from the access node to the wireless devices in the FWA group, wherein adjusting includes increasing the periodicity, causing the wireless devices in the FWA group to receive the CSI-RS from the access node less frequently than the wireless devices in the mobile group; and adjusting a periodicity for receiving a sounding reference signal (SRS) from the FWA group, causing the wireless devices in the FWA group to send the SRS to the access node less frequently than the wireless devices in the mobile group.

12. The processing node of claim 11, the operations further comprising grouping the wireless devices into the mobile group and the FWA group based on respective single-network slice selection assistance information (S-NSSAI).

13. The processing node of claim 12, wherein the S-NSSAI includes a slice service type (SST) and a slice differentiator (SD) and the operations further comprise grouping the wireless devices includes grouping wireless devices having a first SD value in the FWA group.

14. The processing node of claim 13, further comprising grouping wireless devices with a second SD value in the mobile group.

15. The processing node of claim 11, the operations further comprising adjusting the CSI-RS periodicity for the FWA group to a maximum allowed by the network.

16. The processing node of claim 11, the operations further comprising adjusting the SRS periodicity for the wireless devices in the FWA group to a maximum allowed by the network.

17. An access node comprising:

a processor programmed to perform operations including:

grouping wireless devices connected to an access node in a network into at least two groups including a fixed wireless access (FWA) group;

adjusting a periodicity for a channel state information (CSI)-reference signal (RS) sent from the access node to the wireless devices in the FWA group, wherein adjusting includes increasing the periodicity, causing the wireless devices in the FWA group to receive the CSI-RS from the access node less frequently than prior to the adjustment; and adjusting a periodicity for a sounding reference signal (SRS) transmitted from the FWA group, causing the wireless devices in the FWA group to send the SRS to the access node less frequently than prior to the adjustment.

18. The access node of claim 17, wherein the at least two groups further comprise a mobile group.

19. The access node of claim 18, the operations further comprising adjusting the periodicity for the CSI-RS, causing the wireless devices in the mobile group to receive the CSI-RS more frequently than the wireless devices in the FWA group.

20. The access node of claim 18, the operations further comprising allowing additional wireless devices in the FWA group based on adjusting the periodicity for the SRS.

\* \* \* \* \*